United States Patent
Vazquez-Rivera et al.

(10) Patent No.: US 10,992,486 B2
(45) Date of Patent: Apr. 27, 2021

(54) COLLABORATION SYNCHRONIZATION

(71) Applicant: INTERNATIONAL BUSINESS MACHINES CORPORATION, Armonk, NY (US)

(72) Inventors: Rogelio Vazquez-Rivera, Acton, MA (US); Amy D. Travis, Arlington, MA (US); Jonathan Dunne, Dungarvan (IE); Charlotte Hutchinson, Tonbridge (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 18 days.

(21) Appl. No.: 16/208,356

(22) Filed: Dec. 3, 2018

(65) Prior Publication Data

US 2020/0177403 A1    Jun. 4, 2020

(51) Int. Cl.
*G06F 40/30* (2020.01)
*H04L 12/18* (2006.01)
*H04L 29/08* (2006.01)
*G06Q 10/10* (2012.01)

(52) U.S. Cl.
CPC .......... *H04L 12/1818* (2013.01); *G06F 40/30* (2020.01); *G06Q 10/10* (2013.01); *H04L 67/22* (2013.01)

(58) Field of Classification Search
CPC ........................... G06F 15/825; G06F 16/9535
See application file for complete search history.

(56) References Cited

U.S. PATENT DOCUMENTS

| | | | |
|---|---|---|---|
| 6,985,901 B1 | 1/2006 | Sachse et al. | |
| 7,027,995 B2 | 4/2006 | Kaufman et al. | |
| 8,914,373 B2 | 12/2014 | King et al. | |
| 9,305,319 B2 | 4/2016 | Maor et al. | |
| 9,722,965 B2 | 8/2017 | Cecchi et al. | |
| 2002/0184063 A1* | 12/2002 | Kaufman | G06Q 10/109 |
| | | | 705/7.12 |
| 2009/0141023 A1* | 6/2009 | Shuster | G06T 3/40 |
| | | | 345/419 |
| 2010/0205541 A1* | 8/2010 | Rapaport | G06Q 30/02 |
| | | | 715/753 |

(Continued)

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

(Continued)

*Primary Examiner* — Rayeez R Chowdhury
(74) *Attorney, Agent, or Firm* — Cuenot, Forsythe & Kim, LLC

(57) ABSTRACT

Synchronizing collaboration times for members of a team includes extracting emotive content and topical indicia from conversation data generated from multiple electronically captured conversations involving the team members. A model for generating time-based collaboration profiles for each member with respect to a specific topic can be constructed based on the emotive content and topical indicia. A synchronized collaboration time for the members of the team can be determined based on comparisons of each team member's respective collaboration profile.

20 Claims, 8 Drawing Sheets

(56) References Cited

U.S. PATENT DOCUMENTS

| | | | | |
|---|---|---|---|---|
| 2012/0179981 | A1* | 7/2012 | Whalin | H04W 4/21 |
| | | | | 715/753 |
| 2012/0331404 | A1* | 12/2012 | Buford | G06Q 10/10 |
| | | | | 715/757 |
| 2014/0004889 | A1* | 1/2014 | Davis | H04L 67/306 |
| | | | | 455/466 |
| 2015/0072717 | A1 | 3/2015 | King et al. | |
| 2015/0207765 | A1* | 7/2015 | Brantingham | H04L 51/046 |
| | | | | 715/758 |
| 2019/0166082 | A1* | 5/2019 | Goenka | H04L 51/32 |

OTHER PUBLICATIONS

Blei, D. et al., "Latent dirichlet allocation," Journal of Machine Learning Research 3, Jan. 2003, pp. 993-1022.

McGregor, J., "The best time of day—and year—to work most effectively," [online] The Washington Post © 1996-2018, Jan. 4, 2018, retrieved from the Internet: <https://www.washingtonpost.com/news/on-leadership/wp/2018/01/04/the-best-time-of-day-and-year-to-work-most-effectively/?noredirect=on&utm_term=.b47554e085a3>, 6 pg.

MacLellan, L., "The best time of day to get things done, according to data," [online] Quartz at Work, Dec. 7, 2017, retrieved from the Internet: <https://qz.com/work/1149868/how-to-be-more-productive-at-work-the-best-time-of-day-to-get-things-done-according-to-data/>, 9 pg.

Bracher, S., "Secure Information Flow for Inter-organizational Collaborative Environments," Bond University, Apr. 2009, 150 pg. Theses.

"Systems to Provide Users with Impromptu Conversation Summaries and Make Conversational Recommendations, with an Emphasis on Personal Customization, Based on Previous Conversations," Jun. 24, 2015, IP.Com Prior Art Database, Technical Disclosure IPCOM000246660D, 6 pg.

"Determining High-Level Topical Annotations for a Conversation" Jan 3, 2018, IP.Com Prior Art Database, Technical Disclosure, IPCOM000252291D, 34 pg.

"Auto Dashboard Build Up Based on a Social Conversation," Jan. 22, 2018, IP.Com Prior Art Database, Technical Disclosure, IPCOM000252539D, 4 pg.

\* cited by examiner

COLLABORATION SYNCHRONIZATION

BACKGROUND

The present disclosure relates to computer systems, and more particularly, to computer-based collaborative work systems.

Computer-based systems can facilitate collaboration among members of a work team by enabling the members to exchange ideas and make decisions without each being present at the same time at an identical location. Such systems include computer-based collaborative work systems, e-chats, on-line web conferencing, remote videoconferencing, and workflow management systems. Such systems not only provide convenience but flexibility as to which combinations of members meet and when, depending on the specific phase of a project.

SUMMARY

A method includes extracting, using a computer processor, emotive content and topical indicia from conversation data generated by multiple, electronically captured conversations involving multiple users. The method can include constructing for each user a model for generating a time-based collaboration profile, the model based on the emotive content and topical indicia and pertaining to one or more specific topics. Additionally, the method can include determining a synchronized collaboration time for the users based on a comparison of the collaboration profiles.

A system includes a processor programmed to initiate executable operations. The executable operations can include extracting emotive content and topical indicia from conversation data generated by multiple, electronically captured conversations involving multiple users. The executable operations also can include constructing for each user a model for generating a time-based collaboration profile, the model based on the emotive content and topical indicia and pertaining to one or more specific topics. Additionally, the executable operations can include determining a synchronized collaboration time for the users based on a comparison of the collaboration profiles.

A computer program product includes a computer readable storage medium having program code stored thereon, the program code executable by a data processing system to initiate executable operations. The executable operations can include extracting emotive content and topical indicia from conversation data generated by multiple, electronically captured conversations involving multiple users. The executable operations also can include constructing for each user a model for generating a time-based collaboration profile, the model based on the emotive content and topical indicia and pertaining to one or more specific topics. Additionally, the executable operations can include determining a synchronized collaboration time for the users based on a comparison of the collaboration profiles.

DETAILED DESCRIPTION

Figure 1:
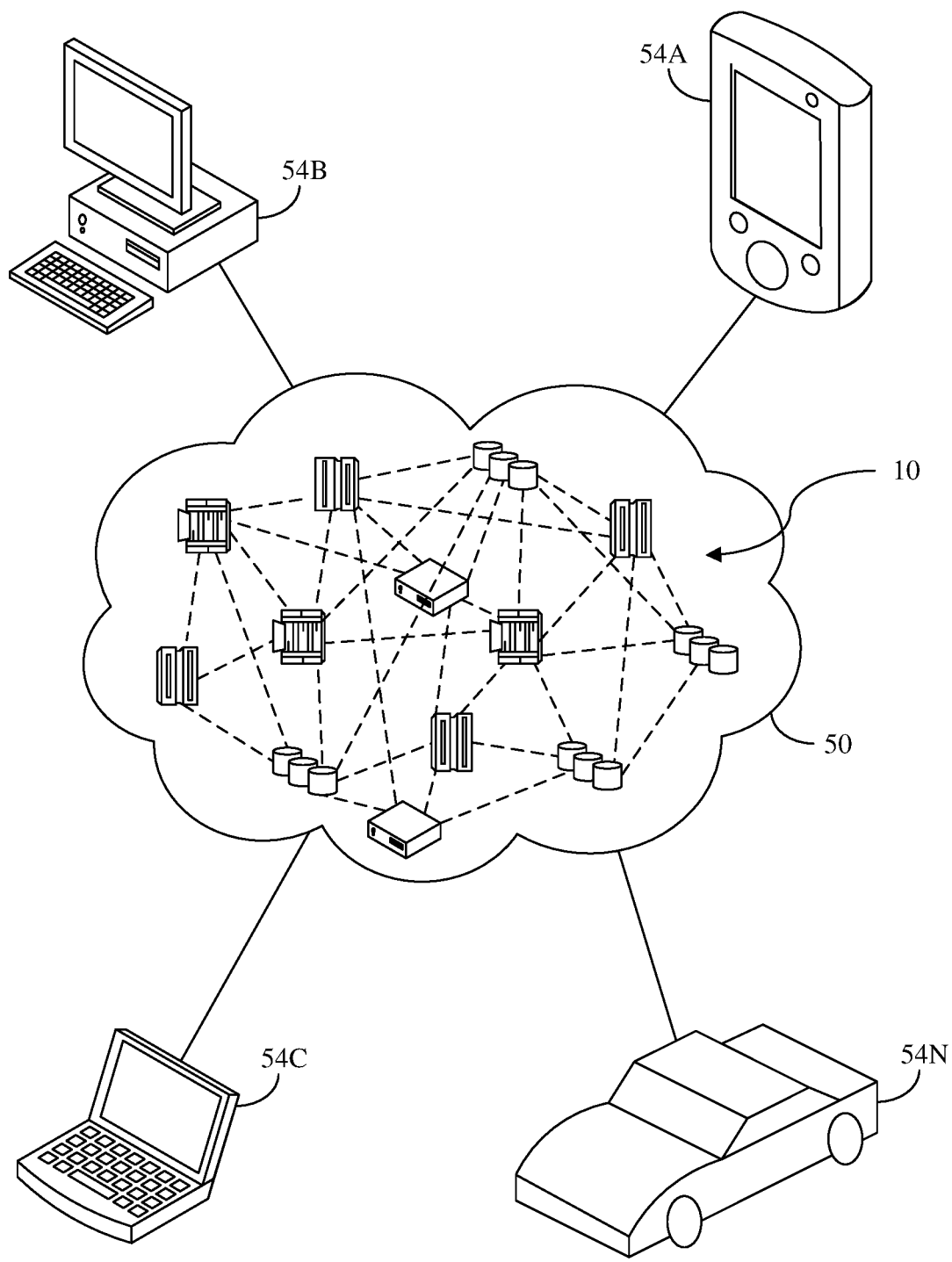
FIG. 1 depicts a cloud computing environment according to an embodiment of the present invention.

The present disclosure relates to computer systems, and more particularly, to computer-based collaborative work systems.

Systems such as web-based conferencing, e-meetings, e-chats, and remote videoconferencing, as well as various collaborative work tools provide convenience and flexibility in the timing of collaborative exchanges among team members. None of these systems and tools, however, address certain physical aspects that can be important determinants of team productivity and creativity. These aspects pertain to the timing of meetings—whether via e-meetings, e-chats, remote videoconferencing, or the like—in which different members engage in conversations dealing with different topics.

Various studies show that different individuals exhibit different patterns with respect to times when the individuals are best suited for performing a specific task or addressing a specific topic. Different individuals also differ with respect to the length of time that they are able to work productively on a specific task or topic. It follows therefore that for any given group of individuals not all times are equally likely to be optimal in terms of collaboration. Indeed, various studies have been conducted attempting to determine the optimal times for collaborations.

The methods, systems, and computer program products disclosed herein predict optimal times for collaboration based on physically observable events. Optimal collaboration times are predicted based on comparisons of time-based collaboration profiles of each member of a collaborative team. Each time-based collaboration profile is generated using a member-specific model. The models are constructed with machine learning and are based on data extracted from electronically captured conversations involving team members. Conversations can occur with text messaging, on-line conferencing, e-chats, video conferencing, and other forms of electronic communication.

A system, according to an embodiment disclosed herein, uses data mining to identify system user patterns of behavior over time and with respect to specific topics. The behavior can include such observable phenomena as the user's word choices during conversations, the user's tone, the repetition of certain phrases, and the like. In certain embodiments, other observable behavior can include, for example, the pressure applied to the keys of a keyboard during a message exchange. Analyzing such behavioral indicia, the system identifies emotive content. An individual's emotions can predict the individual's productivity at certain times and with respect to specific topics. For example, an individual's behavior may indicate calmness or enthusiasm in discussing certain topics at a certain time of the day, but frustration at other times. The system predicts that, at least with respect to the specific topic, the individual is positively emotive—and hence more productive—at one time, but emotively negative and not as productive at other times.

Using these analytical techniques, the system compares the different productivities of different members of a collaborative team as embodied in the members' respective collaboration profiles. Base on the comparisons, the system predicts optimal times for the members to collaborate on specific topics.

The systems described herein can be incorporated in or used in conjunction with various collaborative tools. The system improves the performance of such tools by predicting when the tools are used most effectively by individual members of a collaborative team. The system can improve the performance of an on-line collaborative workflow management system by predicting an optimal time to initiate a collaborative workflow. The system can further enhance performance of the workflow management system by determining when a workflow should be stopped due to a predicted drop in the productivity of one or more of the collaborators based on their respective collaboration profiles. The system can then predict an optimal time when the workflow should resume.

The system can also improve the performance of an on-line calendaring system. The system can predict the optimal productivity times of individual team members based on their respective collaboration profiles. The system can compare collaboration profiles and predict optimal times for the team to engage in a collaborative effort. The system can search the calendars of each of the team members to determine which of the optimal times coincides with open times of each member or a specific subset of the team members. The system thus converts a standard on-line calendaring system from a mere reminder mechanism to a tool for predicting times of maximal team productivity.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
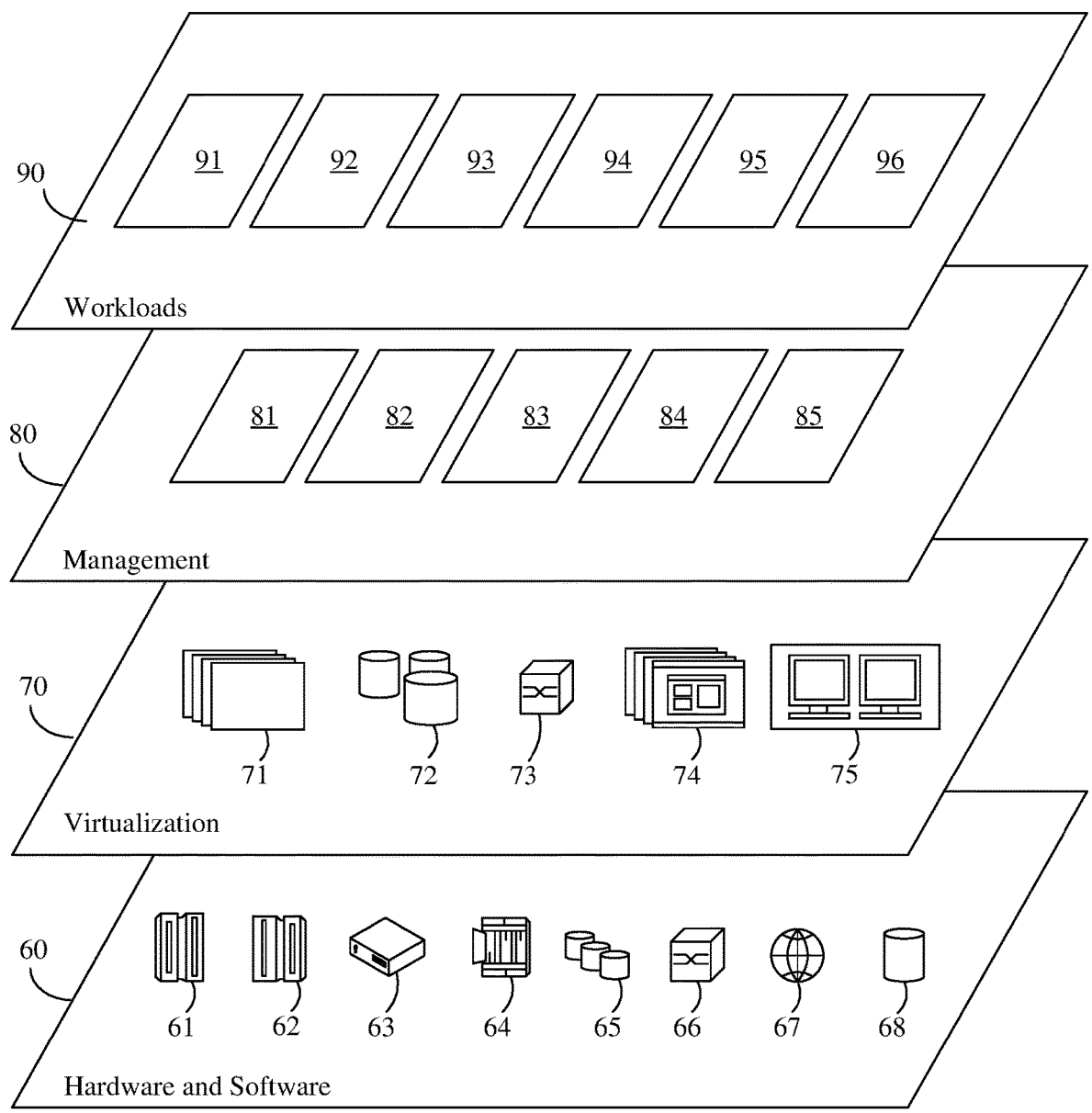
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaboration synchronization system 96.

Collaboration synchronization system 96 predicts optimal times for a team to collaborate on a project dealing with a specific topic or set of topics. The system analyzes data collected from electronically captured conversations involving members of the team. The system extracts emotive content and topical indicia from the data. Based on the emotive content and topical indicia, the system constructs a predictive model using machine learning. The model is used by the system to generate a time-based collaboration profile for each team member. The system predicts the optimal collaboration times based on comparing the team members' collaboration profiles.

A collaboration synchronization system such as system 96 can be implemented in a network-connected server. The system can be implemented as processor-executed code that executes on a server processor. In other embodiments, the system can be implemented in hardwired circuitry integrated with other server circuitry. In still other embodiments the system can be implemented in a combination of code and circuitry in a single server or in multiple servers. The networked server can be, for example, a cloud computing node.

Figure 3:
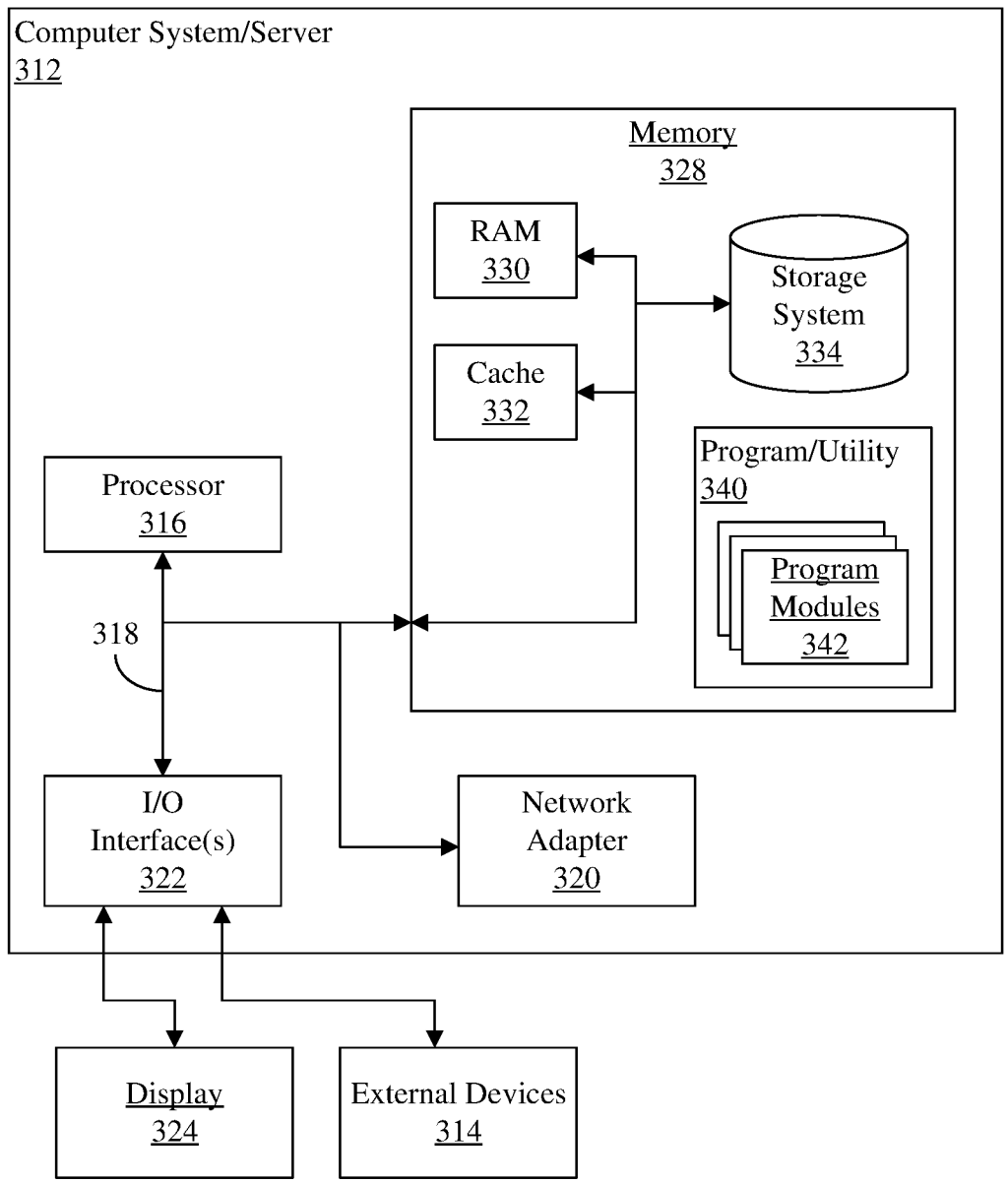
FIG. 3 depicts a cloud computing node according to an embodiment of the present invention.

Referring now to FIG. 3, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

Cloud computing node 300 includes a computer 312, which is operational with numerous other general-purpose or special-purpose computing system environments or configurations. Examples of well-known computing systems, environments, and/or configurations that may be suitable for use with computer 312 include, but are not limited to, personal computers, servers, thin clients, thick clients, handheld or laptop devices, multiprocessor systems, microprocessor-based systems, set top boxes, programmable consumer electronics, network PCs, minicomputers, mainframe computers, and distributed cloud computing environments that include any of the above systems or devices, and the like.

Computer 312 may be described in the general context of computer system-executable instructions, such as program modules, being executed by a computer or computing system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer 312 in cloud computing node 300 is shown in the form of a general-purpose computing device. The components of computer 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer-readable media. Such media may be any available media that is accessible by computer 312, and includes both volatile and non-volatile media, removable and non-removable media.

Memory 328 can include computer-readable media in the form of volatile memory, such as random-access memory (RAM) 330 and/or cache memory 332. Computer 312 may further include other removable/non-removable, volatile/non-volatile computer storage media. By way of example, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments disclosed.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the embodiments described herein.

For example, one or more of the program modules may include system 96 or portions thereof. Program/utility 340 is executable by processor 316. Program/utility 340 and any data items used, generated, and/or operated upon by node 300 are functional data structures that impart functionality when employed by node 300. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 312 may also communicate with one or more external devices 314 such as a keyboard, a pointing device, a display 324, etc.; one or more devices that enable a user to interact with computer 312; and/or any devices (e.g., network card, modem, etc.) that enable computer 312 to communicate with one or more other computing devices. Such communication can occur via Input/Output (I/O) interfaces 322. Computer 312 can communicate with one or more networks such as a local area network (LAN), a general wide area network (WAN), and/or a public network (e.g., the Internet) via network adapter 320. As depicted, network adapter 320 communicates with the other components of computer 312 via bus 318. It is emphasized that although not shown, other hardware and/or software components could be used in conjunction with computer 312. Examples include, but are not limited to, the following: microcode, device drivers, redundant processing units, external disk drive arrays, RAID systems, tape drives, and data archival storage systems.

While node 300 is used to illustrate an example of a cloud computing node, it should be appreciated that a computer system using an architecture the same as, or similar to, that shown in FIG. 3 may be used in a non-cloud computing implementation to perform the various operations described herein. In this regard, the example embodiments described herein are not intended to be limited to a cloud computing environment.

Figure 4:
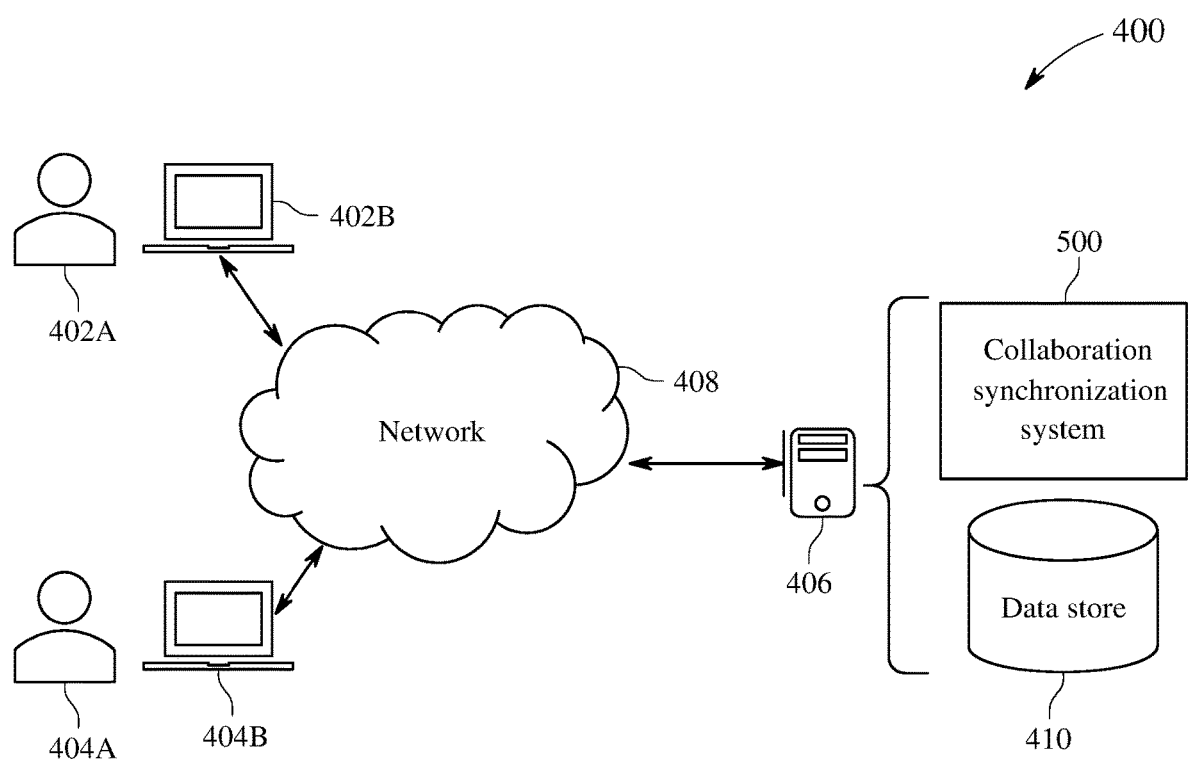
FIG. 4 depicts an environment in which a collaboration synchronization system is used according to one embodiment of the present invention.

FIG. 4 depicts a communication environment 400 in which, according to one embodiment, a collaboration synchronization system such as system 96 can be implemented. Illustratively, communication environment 400 includes system users 402A and 404A that communicate with others via computers 402B and 404B, respectively. Although only two users are explicitly shown, communication environment 400 can include more than two system users. One or both computers can be a computer such as computer 312 illustrated in FIG. 3. Computers 402B and 404B are capable of communicating with other computers, as well as various communication devices, using a network card, modem, router, or the like. Other communication devices can be substituted for computers 402B and 404B. Other communication devices, such as smartphones, tablets, and the like, can be used in conjunction with computers 402B and 404B.

Communication environment 400 also illustratively includes server 406. Server 406 is communicatively coupled to computers 402B and 404B via communication network 408. Communication network 408 can be any type of network over which voice and/or textual data can be exchanged between two or more users.

Users 402A and 404B engage in multiple conversations with each other and/or with other users not explicitly shown in FIG. 4. The conversations comprise exchanges of voice and/or textual data over network 408, and, depending on the mode of communication, can include visual data as well. The conversations concern users' collaborations on one or more projects or tasks that each is engaged in. The conversations can occur in e-meetings, on-line chats, web-based conferences, video conferences, or other forms of electronic communication. The conversations can involve various collaborative tools by which users establish workspaces, exchange ideas, pose questions, and otherwise engage electronically in various collaborative efforts.

Voice conversations (including ones electronically captured as part of a video-based conference) are converted by a voice-to-text converter (not explicitly shown) into computer-processable data, which along with text data of conversations are saved to data store 410 residing in the memory of server 406.

Collaboration synchronization system 500 also illustratively resides on server 406. The system can be implemented in processor-executable code stored in the memory of server 406 and executing on one or more processors of the server. In other embodiments, collaboration synchronization system 500 can be implemented in dedicated, hardwired circuitry integrated with the circuitry of server 406. In yet another embodiment, the system is implemented in server 406 as a combination of circuitry and code. In still other embodiments, collaboration synchronization system 500 and data store 410 can reside on separate but communicatively coupled computing devices. The electronically captured data in data store 410 comprise conversation corpora.

Figure 5:
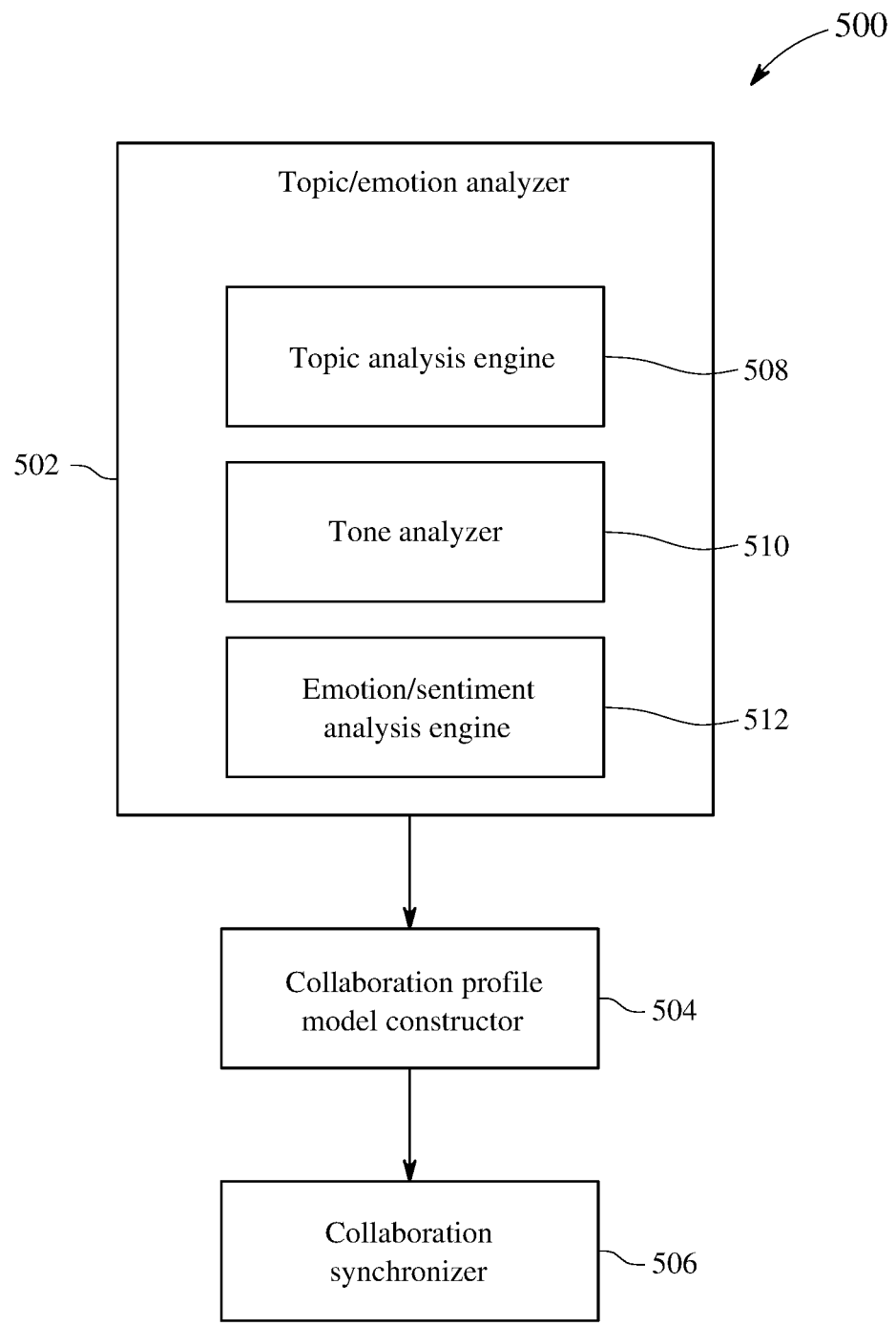
FIG. 5 depicts the architecture of a collaboration synchronization system according to an embodiment of the present invention.

The conversation corpora are analyzed by collaboration synchronization system 500 for predicting or estimating optimal times for select groups of users to collaborate. Referring additionally now to FIG. 5, collaboration synchronization system 500 comprises a topic/emotion analyzer 502, collaboration profile model constructor 504, and collaboration synchronizer 506.

Topic/emotion analyzer 502 comprises topic analysis engine 508, tone analyzer 510, and emotion/sentiment analysis engine 512. Initially, the electronically captured conversation data is analyzed by topic analysis engine 508 to extract patterns that reveal the topics of conversations and emotions exhibited by users during electronically captured conversations. Topic analysis engine 508 can analyze the data for topic indicia using latent Dirichlet allocation (LDA). Introduced by Blei, Ng, and Jordan (*Journal of Machine Learning Research* 3:993-1022) in 2003, LDA is a generative probabilistic, three-level hierarchical Bayesian model for analyzing discrete data such as text corpora. Each item of a collection (e.g., text corpus) is modeled as a finite mixture over an underlying set of topics, and each topic is modeled as an infinite mixture over an underlying set of topic probabilities. The corpora of electronically captured conversation data can be treated as any text corpora and analyzed using LDA to identify topics and extract topical indicia from the conversation data.

Alternatively, or additionally, topic analysis engine 508 can analyze the electronically captured data for topic indicia using a biterm-based analysis. Biterm is a generative topic model algorithm that learns topics over short texts by directly modeling the generation of biterms in an entire corpus. As applied with respect to the disclosed embodiments, a biterm is an unordered word-pair co-occurrence in a short context.

The techniques described are only for purposes of illustration and should not be construed as limitations. In other embodiments, different analysis techniques can be used.

The topic/emotion analyzer 502 extracts patterns that reveal the emotive content in the electronically captured data using tone analyzer 510 and emotion/sentiment analysis engine 512. Tone analysis engine 510 can analyze the electronically captured data in the context of an overarching conversation and at a sentence-by-sentence level to identify a tone (e.g., anger, joy, sadness, analytical, confidence, tentativeness, or any of a range of other emotions the engine can be trained to recognize). Tone analysis engine 510 can associate tone with topics, as well as points in the conversation at which the tones are strongest.

Additionally, emotion/sentiment analysis engine 512 can analyze electronically captured data for emotive content. Emotion/sentiment analysis engine 512 can be implemented using natural language processing (NLP). Generally, NLP facilitates computer-human (natural) language interaction. More specifically, NLP enables computers to derive computer-understandable meaning from natural language (e.g., text) input. The International Organization for Standardization (ISO) publishes standards for NLP, one such standard being ISO/TC37/SC4. As part of NLP, semantic analysis may be performed. Semantic analysis may follow parsing and involve extraction of context-independent aspects of a sentence's meaning, including entities, named entities, the semantic roles of entities mentioned in the sentence, sentiment analysis, and quantification information, such as cardinality, iteration, and dependency. Using NLP, emotion/sentiment analysis engine 512 also extracts emotive content from the electronically captured conversation data.

The topical indicia and emotive content extracted through the analysis of the conversation data provide input into a model for generating a time-based collaboration profile for a user. The model is constructed by collaboration profile model constructor 504 as a recurrent neural network (RNN). An RNN is a machine learning technique based on a nonlinear model of an artificial neuron. Each stage of the RNN involves taking the inner product of a feature vector and weight vector and using the product as the input to an activation function. The model "learns" or is "trained" to classify objects with an acceptable level of accuracy by adjusting values of the weight vector over multiple iterations using a corpus of training data. Unlike a traditional artificial neural network, however, the RNN model utilizes feedback, which takes into account initial and past states of the model and allows serial processing.

Figure 6:
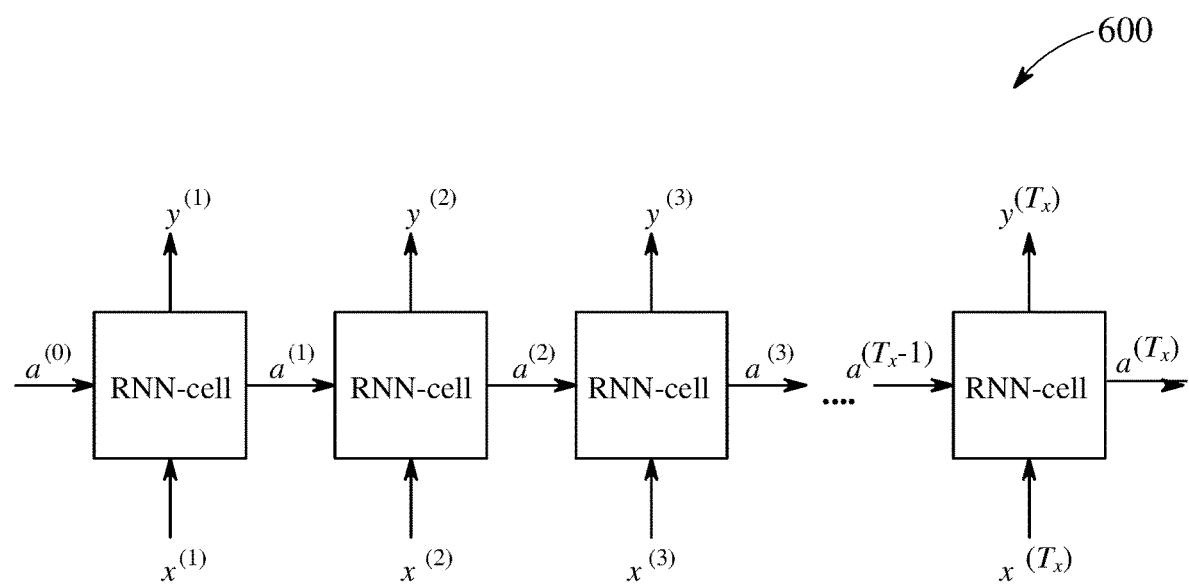
FIG. 6 is a pictorial representation of a recurrent neural network as used in a collaboration synchronization system according to an embodiment of the present invention.

FIG. 6 is a pictorial representation of RNN 600 comprising, in series, feature vectors $x^{(i)}$ and weight vectors $a^{(i-1)}$ whose inner product is input into a corresponding cell (activation function) to yield output $y^{(i)}$. The electronically captured conversation data provides a training corpus for the RNN and is used by the collaboration profile model constructor 504 to construct a collaboration model for a user based on the conversations the user has participated in. Topical indicia and emotive content can be assigned values that are arranged as elements in feature vectors $x^{(i)}$. Topical indicia can include, for example, topic-specific terms used in conversations. Emotive content can include emotions exhibited in conversations and sentiments expressed on certain topics. The dynamic nature of the RNN takes into account conversation aspects involving a time dimension. This enables collaboration profile model constructor 504 to build a model for generating a time-based collaboration profile of a user, the profile indicating the user's capability for and receptiveness to collaboration depending on the topic and time that the collaboration occurs.

Collaboration profile model constructor 504 constructs a model for each user and uses the models to generate for each user a time-based collaboration profile. Each profile provides an objective measure of times at which each user is well-suited for engaging in collaboration on a particular topic, as well as times at which the user is not. Collaboration synchronizer 506 compares users' respective collaboration times, and based on the comparison, estimates the optimal collaboration time or times for a specific set of users to collaborate on a specific topic or task.

Figure 7:
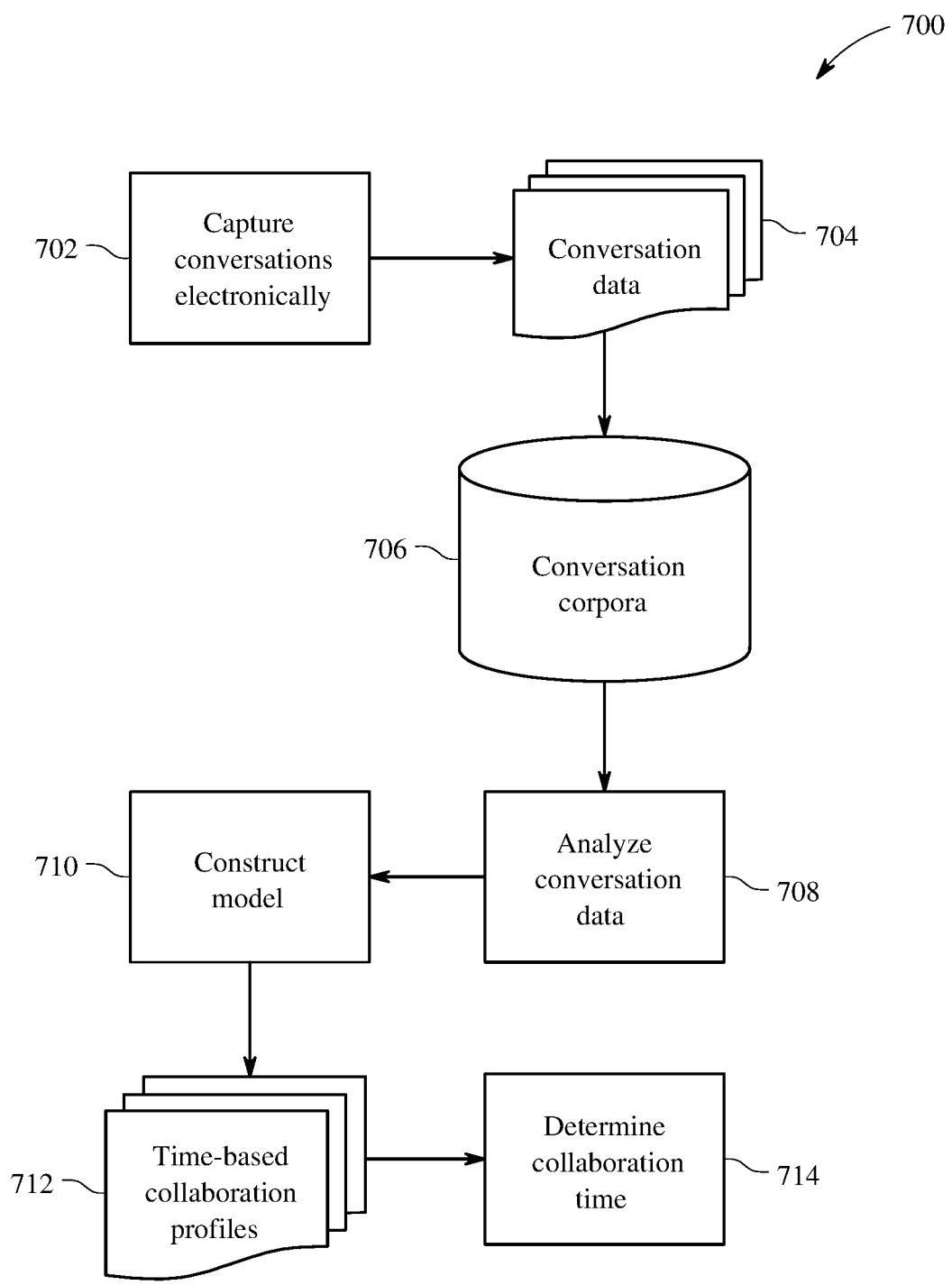
FIG. 7 depicts operative features of a collaboration synchronization system according to an embodiment of the present invention.

FIG. 7 depicts the operative features of collaboration synchronization system 500 according to one embodiment. Initially, the system electronically captures multiple conversations at 702. The system converts the electronically captured conversations to computer-processable data at 704 and stores the data in computer memory at 706. The data make up conversation corpora. The data is analyzed at 708. Linear Dirichlet allocation (LDA) and/or BiTerm analysis can be used to analyze the data for topical content. Natural language processing (NLP) can be used to analyze the data for emotive content. Alternatively, or additionally, in different embodiments, other comparable data mining and machine-learning techniques can be used.

Based on the analysis, a model is constructed at 710 for each user whose conversations were electronically captured at 702 and which form part of the corpora of conversation data. Each model can be constructed as a recurrent neural network (RNN). Each model is used to generate a user-specific collaboration time profile at 712. A collaboration time profile identifies different collaboration capabilities a user exhibits at different times. Based on the users' respective profiles, a synchronized collaboration time is determined at 714.

A collaboration profile, as described, can provide an indication of times of day that a user is estimated to be best suited for collaborating on a specific topic and times the user is not. The indication can be qualitative in nature. For example, if sentiment is considered a single measure, an individual can be characterized as "positively emotive" at certain times and "negatively emotive" at other times. In quantitative terms, however, characterizing emotions as positive or negative requires consideration of a totality of emotive scores. For example, within a framework comprising the emotions joy, fear, anger, disgust, and sadness, only the first is positive, while the other four are negative. Accordingly, the score associated with joy would have to outweigh the remaining four negative scores to ensure a positive rather than negative emotive characterization. In embodiments for which emotions are associated with quantitative measures, the collaboration time profile can use, for example, ordinal rankings (e.g., integers between 1 and 10) or other relative measures (e.g., real values between 0 and 1) corresponding to different times of day.

A synchronized collaboration time is determined for two users, for example, by selecting a time when both users are "positively emotive" for collaborating on a topic and avoiding times when one user or both users are "negatively emotive." Again, the analysis must treat sentiment as a single measure or the totality of scores must be considered to appropriately distinguish between positive and negative emotional states. In the case of a larger group of potential collaborators, a selected time can be, for example, a time that all users—or the greatest number of users—are "positively emotive." In a different embodiment, assuming appropriate emotive scores are applied such that users' collaboration time profiles provide ordinal rankings, the synchronized collaboration time can be the time in which the sum of all users' rankings is greatest, for example.

Collaboration time profiles provide objective, rather than subjective, estimates of optimal collaboration times. The estimates are generated using statistically valid models that are applied to observable physical phenomena, namely the inherent physical and psychological factors that affect a user's capabilities for engaging in collaborative effort on specific topics at specific times.

In various embodiments, collaboration synchronization system 500 can be integrated in a collaborative workflow. In a particular embodiment, the system can generate a bot that operates in conjunction with the processor-executable code that implements a collaborative workflow management system. The bot can utilize the messaging microservice of the workflow management system to post recommendations generated by collaboration synchronization system 500.

Collaboration synchronization system 500 can estimate, based on comparisons of users' collaboration time profiles, a best time to initiate a set of collaborative workflows. For example, collaboration synchronization system 500, through the bot, can recommend that a new workflow channel space be created at a specific point in time. Collaboration synchronization system 500 also can estimate based on comparisons of users' collaboration time profiles when an on-going collaboration workflow should be suspended and postponed until a later point in time, for example. collaboration synchronization system 500 can use a chatbot to "hold over" messages until the latter point in time that the system estimates is more likely to yield a better outcome because members of the collaborative group are determined to be better disposed (e.g., "emotively positive") to collaboration of the particular topic.

The system improves the performance of collaborative tools by predicting when the tools can be used most effectively. The system improves the performance of an on-line collaborative workflow management system by predicting an optimal time to initiate a collaborative workflow. The system can further enhance performance of the workflow management system by determining when a workflow should be stopped due to a predicted drop in the productivity of one or more of the collaborators based on their respective collaboration profiles. The system can then predict an optimal time when the workflow should resume.

Collaboration synchronization system 500 can operate in real-time, or over extended periods, in conjunction with the text messaging, teleconferencing, video conferencing, or other communication system over which users exchange data and engage in conversations. During an on-going collaborative session, collaboration synchronization system can detect certain emotive indications (as described above) and, based on the emotive indications using learned classifications (also described above), determine that it is better to stop the collaborative session. Collaboration synchronization system 500 can also recommend a future time to resume the collaborative session based on comparisons of the users' collaboration time profiles.

The system additionally, or alternatively, can be integrated with an on-line calendaring system. The system can predict the optimal productivity times of the system users based on their respective collaborative profiles and can compare the profiles. Based on profile comparisons, the system can predict optimal times for users to engage in a collaborative effort. The system can search each user's on-line calendar and determine which of the optimal times coincides with open times on each user's calendar. The system can schedule collaboration sessions and post the session times on each of the users' on-line calendars. The system converts a standard on-line calendaring system from a passive reminder system to an active a tool for improving the user's productivity and that of the user's collaborators.

In addition to voice and text data, the collaboration system 500 can in certain embodiments also analyze other observable phenomena. For example, pressure sensors be attached to a user's keyboard to generate data in response to sensing the pressure exerted on the keys of keyboard by the user when typing a message.

Of course, none of the conversations would be captured in real-time or recoded without the consent of the user. Nor would other indicia be observed or recorded without the user's consent. It is reasonably assumed, however, that users would not object, and indeed, would welcome access to the analyses provided by the system. Each of the features enhances the user's productivity and makes the collaborative tools the user relies on more effective.

Figure 8:
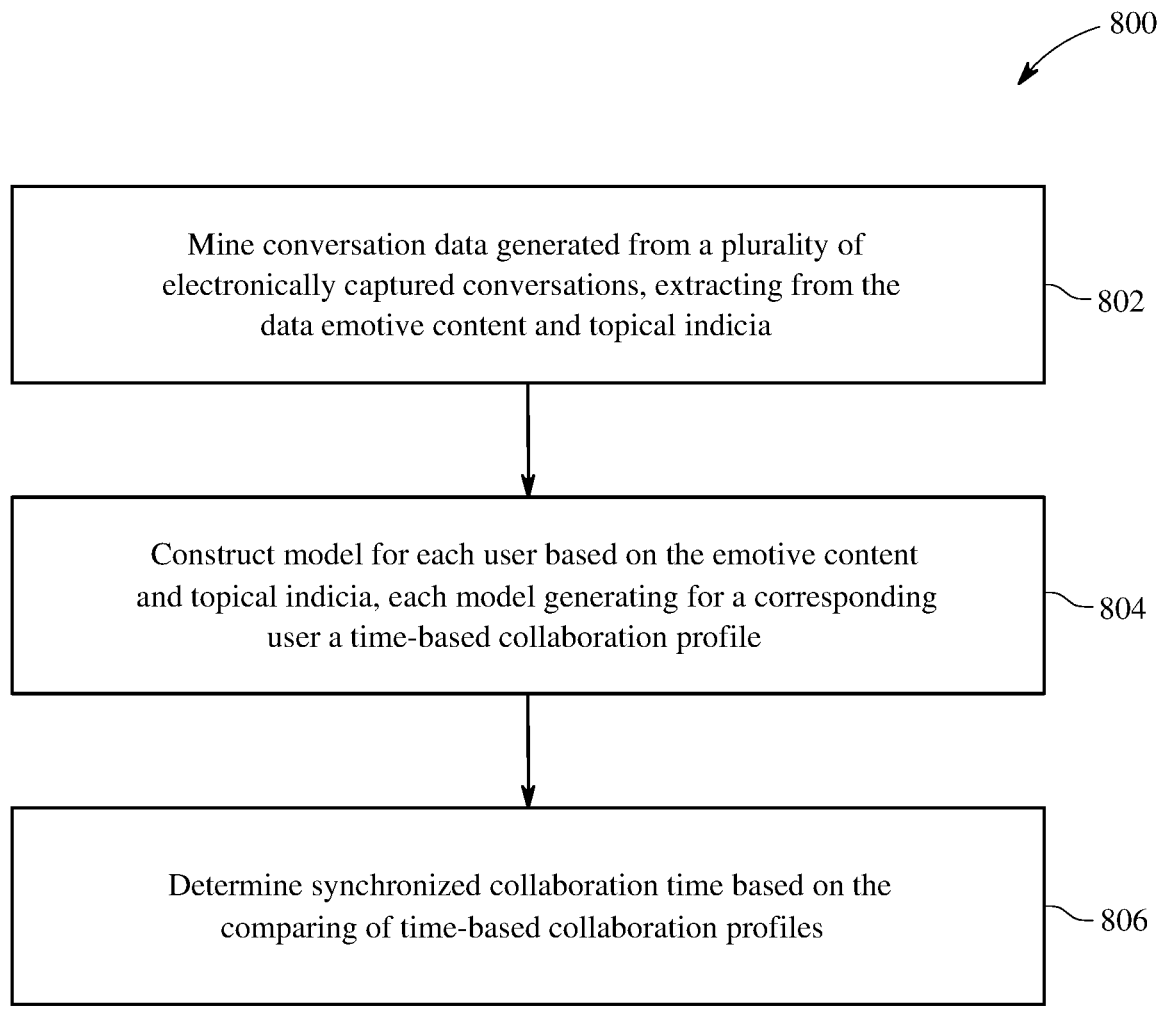
FIG. 8 is a flowchart of a method synchronizing collaboration times according to an embodiment of the present invention.

FIG. 8 is a flowchart of a method 800 of synchronizing collaboration times according to one embodiment. Method 800 can be performed by a system the same or similar to the systems described in connection with FIGS. 1-7. The method can begin when multiple conversations involving multiple team collaborators have been electronically captured. The conversations can be in different forms using different modes of communication. The conversations can involve an exchange of text messages. The conversations can be voice conversations. The conversations can comprise, for example, a combination of voice and text exchanged over various modes of communications, for example.

At 802, the system analyzes data generated by the electronically captured conversations involving the various users, extracting from the data emotive content and topical indicia. The system, at 804, constructs for each of the users a model based on the emotive content and topical indicia. Each model that is constructed by the system generates a time-based collaboration profile for a corresponding user with respect to one or more topics. The system determines a synchronized collaboration time for the users, at 806, based on a comparison of the user's respective collaboration profiles.

The various methods described can be implemented, for example, in program code executable by a data processing system and stored on the computer-readable storage medium of a computer program product. The computer program product can include the computer-readable storage medium (or media) having computer-readable program instructions thereon for causing a processor to carry out aspects of the described embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The methods, systems, and computer program products are described with reference to FIGS. 1-8. The figures are conceptual illustrations allowing for a full explanation of the present embodiments. The figures and examples presented above are not meant to be scope limiting, as other embodiments are possible by way of interchange of some or all of the described or illustrated elements. Moreover, where certain elements of the present embodiments can be partially or fully implemented using known components. Only those portions of such known components that are necessary for an understanding of the present embodiments are described, and detailed descriptions of other portions of such known components are omitted so as not to obscure the embodiments. In the present specification, an embodiment showing a singular component should not necessarily be limiting with respect to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

The descriptions of the various embodiments disclosed herein been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

That which is claimed is:

1. A method, comprising:
  extracting, using computer hardware, emotive content and topical indicia from conversation data generated by a plurality of electronically captured conversations involving a plurality of users;
  constructing for each of the plurality of users, using computer hardware, a model based on the emotive content and topical indicia, each model generating a time-based collaboration profile for a corresponding user with respect to at least one topic; and
  determining, using computer hardware, a synchronized collaboration time for the plurality of users based on a comparison of the collaboration profiles.

2. The method of claim 1, wherein the determining comprises determining a time that a majority of the plurality of users is classified, based on the users' respective collaboration profiles, as positively emotive.

3. The method of claim 1, wherein the determining comprises determining a time based on collaboration profiles that provide ordinal rankings, the time corresponding to a time that the sum of the users' ordinal rankings is greatest.

4. The method of claim 1, wherein the extracting emotive content and topical indicia comprises identifying emotive content using natural language processing of users' contributions to the electronically captured conversations, and extracting topical indicia comprises at least one of modelling the conversation data using latent Dirichlet allocation and modelling word-word co-occurrences in the conversation data.

5. The method of claim 1, further comprising incorporating at least one of the plurality of user models for generating a time-based collaboration profile into a collaboration tool.

6. The method of claim 5, further comprising determining whether to stop an on-going collaboration workflow using the collaboration tool and, responsive to the collaboration workflow stopping, recommending a time to initiate a new collaboration workflow.

7. The method of claim 6, further comprising generating a bot configured to recommend a time for at least one of initiating a collaborative workflow and stopping a collaborative workflow.

8. A system, comprising:
  a processor programmed to initiate executable operations including:
    extracting emotive content and topical indicia from conversation data generated by a plurality of electronically captured conversations involving a plurality of users;
    constructing for each of the plurality of users a model based on the emotive content and topical indicia, each model generating a time-based collaboration profile for a corresponding user with respect to at least one topic; and
    determining a synchronized collaboration time for the plurality of users based on a comparison of the collaboration profiles.

9. The system of claim 8, wherein the determining comprises determining a time that a majority of the plurality of users is classified, based on the users' respective collaboration profiles, as positively emotive.

10. The system of claim 8, wherein the determining comprises determining a time based on collaboration profiles that provide ordinal rankings, the time corresponding to a time that the sum of the users' ordinal rankings is greatest.

11. The system of claim 8, wherein the extracting emotive content and topical indicia comprises identifying emotive content using natural language processing of users' contributions to the electronically captured conversations, and extracting topical indicia comprises at least one of modelling the conversation data using latent Dirichlet allocation and modelling word-word co-occurrences in the conversation data.

12. The system of claim 8, further comprising incorporating at least one of the plurality of user models for generating a time-based collaboration profile into a collaboration tool.

13. The system of claim 12, further comprising determining whether to stop an on-going collaboration workflow using the collaboration tool and, responsive to the collaboration workflow stopping, recommending a time to initiate a new collaboration workflow.

14. A computer program product, comprising:
  a computer readable storage medium having program code stored thereon, the program code executable by a data processing system to initiate operations including:
    extracting emotive content and topical indicia from conversation data generated by a plurality of electronically captured conversations involving a plurality of users;

constructing for each of the plurality of users a model based on the emotive content and topical indicia, each model generating a time-based collaboration profile for a corresponding user with respect to at least one topic; and determining a synchronized collaboration time for the plurality of users based on a comparison of the collaboration profiles.

15. The computer program product of claim 14, wherein the determining comprises determining a time that a majority of the plurality of users is classified, based on the users' respective collaboration profiles, as positively emotive.

16. The computer program product of claim 14, wherein the determining comprises determining a time based on collaboration profiles that provide ordinal rankings, the time corresponding to a time that the sum of the users' ordinal rankings is greatest.

17. The computer program product of claim 14, wherein the extracting emotive content and topical indicia comprises identifying emotive content using natural language processing of users' contributions to the electronically captured conversations, and extracting topical indicia comprises at least one of modelling the conversation data using latent Dirichlet allocation and modelling word-word co-occurrences in the conversation data.

18. The computer program product of claim 14, further comprising incorporating at least one of the plurality of user models for generating a time-based collaboration profile into a collaboration tool.

19. The computer program product of claim 18, further comprising determining whether to stop an on-going collaboration workflow using the collaboration tool and, responsive to the collaboration workflow stopping, recommending a time to initiate a new collaboration workflow.

20. The computer program product of claim 19, further comprising generating a bot configured to recommend a time for at least one of initiating a collaborative workflow and stopping a collaborative workflow.

* * * * *